Patented June 20, 1944

2,352,071

UNITED STATES PATENT OFFICE 2,352,071

AMINOALKYL MALONAMIDE RESINS

Louis H. Bock, Huntingdon Valley, and Alva L. Houk, Philadelphia, Pa., assignors to Röhm & Haas Company, Philadelphia, Pa., a corporation of Delaware No Drawing. Application April 9, 1941, Serial No. 387,680

6 Claims. (Cl. 260—72)

This invention relates to reaction products of N-aminoalkyl malonamides and formaldehyde. It deals with both condensates and resins which are obtainable from these materials.

It has been found that formaldehyde and an N-aminoalkyl malonamide react when mixed to give soluble products, which on heating may be rendered insoluble. The N-aminoalkyl malonamide may be a mono- or a di-amide. These amides are formed by reacting a malonic ester, such as dimethylmalonate or diethylmalonate, with a diamine, such as ethylene diamine, propylene diamine, pentamethylene diamine, etc. At moderate temperatures (below 100° C.) and particularly with an excess of diamine, amides are obtained rather than insoluble polymeric products. These amides are soluble in organic solvents, such as alcohols, dioxane, etc.

Formaldehyde may be used in an aqueous solution, in an organic solvent, such as alcohol, or in a solid form, as paraformaldehyde. Up to half of the formaldehyde requirements may be met by the use of the condensation product of a primary or secondary amine and formaldehyde. As is known, these materials can be condensed to yield products such as bis-(dimethylamino)-methane.

These amine-formaldehyde condensates have a desirable action in many cases in preventing premature gelation of the reaction of an N-aminoalkyl malonamide and formaldehyde. But for this controlling action it is not necessary that the amine-formaldehyde condensate be performed. The same controlling effect results when there is added to the reaction mixture a reactive amine, having hydrogen available for substitution such as dimethylamine, methylamine, ethylamine, diethylamine, caprylmethylamine, ethylene diamine, dicyclohexylamine, allylamine, aniline, etc. The secondary amines of relatively low molecular weight are usually preferable.

The N-aminoalkyl malonamide and formaldehyde, with or without the modifying reactive amine, combine upon being mixed. The reactants may be optionally mixed with a solvent and the reaction may, if desired, be performed under pressure. The mixture is held between 0° C. and about 100° C. to complete the condensation. When the condensates are heated above about 120° C., they are converted to insoluble resins.

At least one mol of formaldehyde per mol of amide is required for resin formation. The preferred proportions are one to three mols of formaldehyde per mol of amide. The larger ratios of formaldehyde give a greater degree of insolubility to the final resin. The tendency of high ratios of formaldehyde to amide to give a premature resinous precipitate can be overcome, as explained, by the addition of a reactive amine.

The condensates and resins are useful in coatings, in treating textiles for improving resilience, and in animalizing cellulosic fibers. The resins are also valuable for purifying gases or for removing anions from liquids.

The following example illustrates the preparation and application of the condensates.

To a mixture of 29 parts of N,N'-bis(aminoethyl)malonamide (from diethyl malonate and an excess of ethylene diamine) and 36 parts of ethylene diamine there were added 36 parts of a 30% aqueous formaldehyde solution. The reaction mixture was stirred and heated for three hours at 70–80° C. and left standing overnight. It was then concentrated under reduced pressure to about 67% of its original volume.

A sample of the condensate was dissolved in water to give a 20% solution. This solution was heated and used to impregnate cotton cloth by dipping. The impregnated cloth was freed from excess solution by squeezing and heated for 40 minutes in an oven at 130° C. The cloth was then washed with soap solution, rinsed, and dyed in a bath of Pontacyl Carmine 6B. A medium shade of purple was obtained on the cloth and the dye was highly resistant to laundering.

A solution of the condensate was poured on a glass plate and dried at room temperature. The plate was baked at 130° C. for 30 minutes. The film of condensate was changed to a hard, somewhat brittle, insoluble resin.

In place of the 36 parts of ethylene diamine used in the example described above, there may be used 64 parts of a 25% aqueous solution of dimethylamine. The reaction is performed as above to give a resinous condensate which is hardened when heated above 120° C.

We claim:

1. As new compositions of matter, the reaction products of formaldehyde and an N-aminoalkyl amide of malonic acid.

2. As a new composition of matter, the reaction product of formaldehyde and N,N'-bis(aminoethyl)malonamide.

3. The method of preparing resinous condensates which comprises reacting below aboht 100° C. an N-aminoalkyl amide of malonic acid and formaldehyde, in the presence of an amine having a reactive hydrogen atom attached to the nitrogen thereof.

4. The method of preparing resinous condensates which comprises reacting below about 100° C. an N-aminoethyl malonamide and formaldehyde in the presence of an amine having a reactive hydrogen atom attached to the nitrogen thereof.

5. The method of claim 4 in which the amine is ethylene diamine.

6. The method of claim 4 in which the amine is dimethylamine.

LOUIS H. BOCK.
ALVA L. HOUK.